(No Model.) 2 Sheets—Sheet 1.
O. LUTHER.
VARIABLE GEAR FOR BICYCLES.
No. 601,574. Patented Mar. 29, 1898.
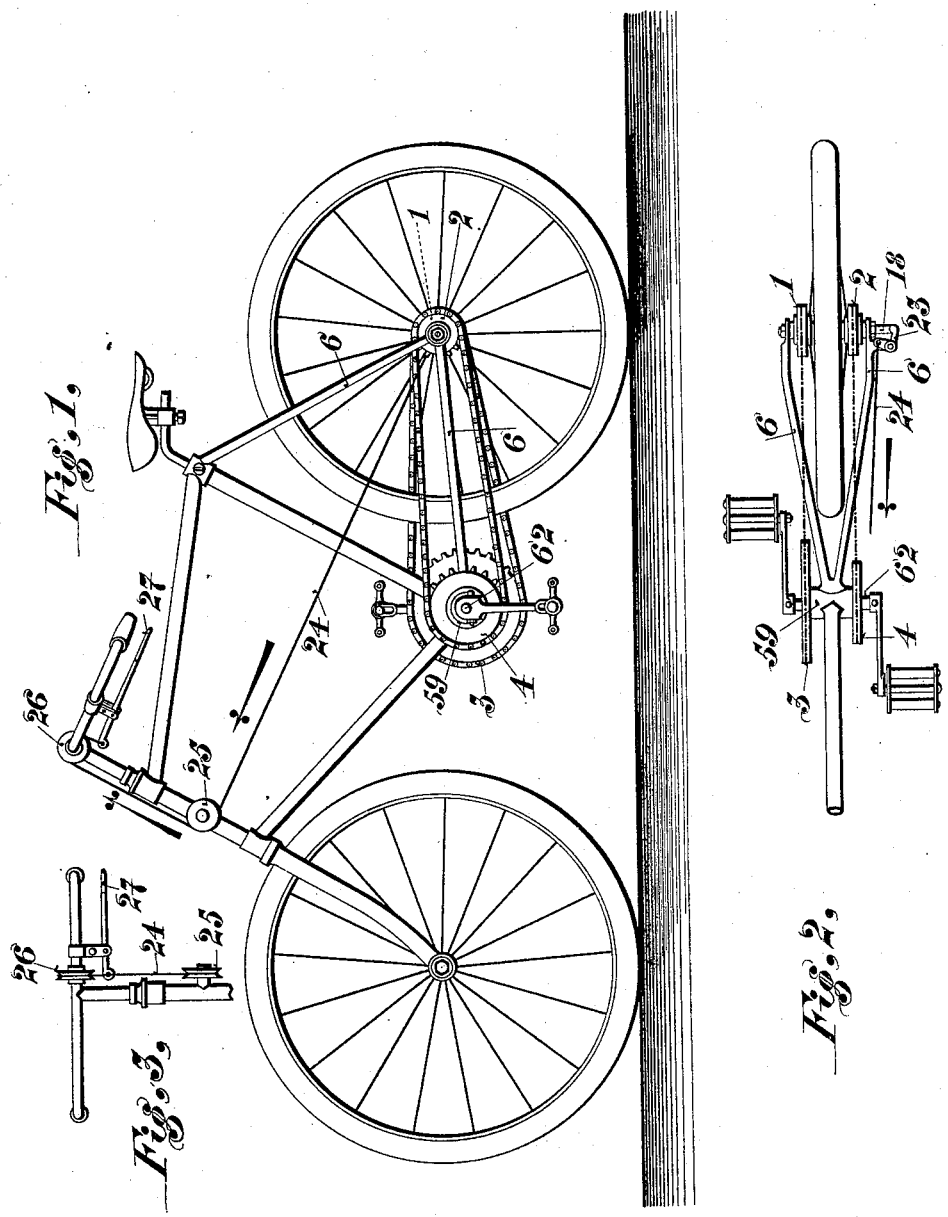
Witnesses:
Geo. W. Rea.
A. H. Norris.
Inventor:
Oscar Luther,
By James L. Norris.
Atty.

(No Model.) 2 Sheets—Sheet 2.
O. LUTHER.
VARIABLE GEAR FOR BICYCLES.
No. 601,574. Patented Mar. 29, 1898.
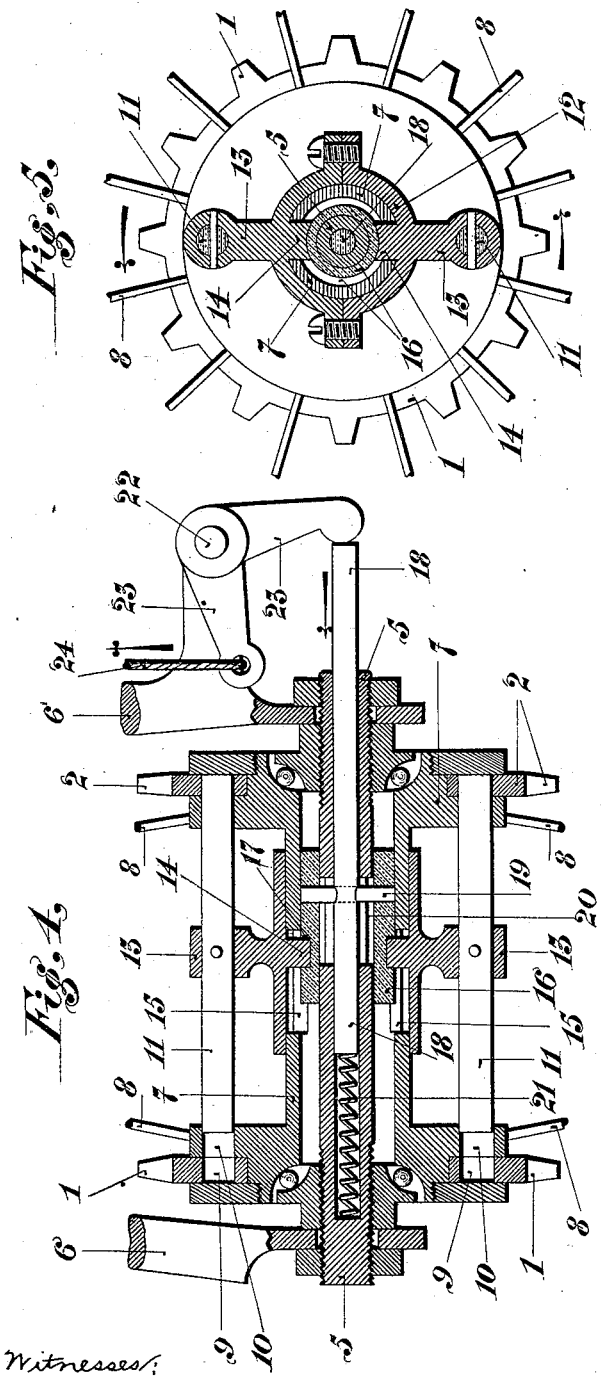
Witnesses:
Geo. W. Rea,
A. H. Norris.
Inventor:
Oscar Luther,
By James L. Norris,
Atty.

UNITED STATES PATENT OFFICE.

OSCAR LUTHER, OF MUNICH, GERMANY.

VARIABLE GEAR FOR BICYCLES.

SPECIFICATION forming part of Letters Patent No. 601,574, dated March 29, 1898.

Application filed October 22, 1896. Serial No. 609,729. (No model.)

*To all whom it may concern:*

Be it known that I, OSCAR LUTHER, engineer, a subject of the Prince Regent of Brunswick, residing at Munich, in the Kingdom of Bavaria and German Empire, have invented new and useful Improvements in Variable-Speed Driving-Gear of Bicycles and other Vehicles, of which the following is a specification.

This invention has for its object to provide a new and improved speed-changer for a cycle; and it consists in the features of construction and in the combination or arrangement of parts hereinafter described and claimed, reference being made to the accompanying drawings, in which—

Figure 1 is a side elevation of a bicycle embodying my invention. Fig. 2 is a detail plan view of the same. Fig. 3 is a detail front elevation. Fig. 4 is a detail longitudinal sectional view through the wheel-hub, and Fig. 5 is a detail vertical sectional view taken centrally through the wheel-hub.

In order to enable those skilled in the art to make and use my invention, I will now describe the same in detail, referring to the drawings, wherein—

The numerals 1 and 2 indicate wheels of substantially the same diameter, and 7 the wheel-hub, supported by the axle 5 and on the ends of which the wheels 1 and 2 are loosely mounted. The wheel-axle is connected with the cycle-frame in any suitable manner, and the wheel and hub rotate around the axle. The wheels 1 and 2 are constructed with orifices 9, arranged parallel with the axle, and the hub is constructed at its ends with similar orifices 10. These orifices are arranged near the peripheries of the wheels 1 and 2 and the hub 7. The hub is provided with horizontal coupling pins or bolts 11, arranged in the orifices 10. The coupling-pins in their intermediate position do not touch either of the wheels 1 and 2, but when moved to the right or to the left they enter the holes 9, passing in front of them, thereby connecting the wheel 1 or 2 with the cycle-wheel 7 8. In this manner the coupling itself is obtained, and it only remains now to connect the coupling-pins 11 and the hand of the cyclist in such manner as to enable the latter to effect coupling while riding by means of a handle or lever. For this purpose a reversing device is used, which forms the chief object of this invention.

The next piece from which movement is transmitted to the coupling is a longitudinally-shiftable device composed, as here shown, of a sleeve 12, inclosing the hub of the rear wheel of the cycle, which sleeve, by means of its arms 13, is secured to the coupling bolts or pins 11 and has pins or teeth 14 passing into the hollow interior of the hub 7 through the longitudinal slots 15 in the wall of said hub. A sleeve or ring 16, arranged in the hub 7, but not taking part in its rotation, engages by means of a groove 17 the corresponding pins 14 and causes them to participate in each of its longitudinal movements, said groove 17 allowing at the same time free rotation of the pins or teeth 14, together with the sleeve 12 and the hub 7.

The movement of the sleeve or ring 16 is caused by a pin or rod 18, arranged in the longitudinal bore in the axle 5, the connection of the sleeve or ring 16 and of the pin 18 being produced by a cross-pin 19, penetrating both parts, longitudinal slots 20 in the hollow axle 5 allowing the passage and longitudinal movement of the connecting cross-pin 19. In this way each longitudinal movement of the pin 18 is transmitted to the sleeve or ring 16 and from the latter to the sleeve 12, and thus to the coupling-pins 11.

In order to establish a simple connection between the pin 18 and the hand of the cyclist, there is arranged at one end of the pin 18 a spring 21, which normally holds one wheel coupled. Then in order to operate the device it is sufficient to have a bell-crank lever 23, pivoted on a pin 22, and a cord 24, which passes over guide-rollers 25 and 26, Figs. 1 and 3, and is connected to a hand-lever 27. As long as the latter is held raised one of the two wheels is coupled, while the release of the lever 27 causes the other wheel to become coupled.

Having thus described my invention, what I claim is—

The combination, in a speed-changer for a cycle, of an axle having a longitudinal bore, a wheel-hub supported by the axle, wheels loosely mounted on the ends of the hub and having orifices near their peripheries, a horizontal coupling-pin arranged in the hub and movable lengthwise into engagement with the orifices of either wheel, a shiftable device mounted on the hub and having an outwardly-projecting arm connected with the horizontal coupling-pin, a non-rotary sleeve arranged within the hub and engaged with said shiftable device, a pin movable lengthwise in the bore of the axle, a cross-pin connecting said lengthwise-movable pin with the said non-rotary sleeve, a spring acting to move the lengthwise-movable pin in one direction in the axle-bore, a lever pivoted on the cycle-frame and bearing against the outer end of the lengthwise-movable pin to move it against the tension of the spring, and devices operated by the rider to swing said lever, substantially as described.

In testimony whereof I have hereunto set my hand in presence of two subscribing witnesses.

OSCAR LUTHER.

Witnesses:
RICHARD LIPPS,
CARL BECKER.